H. G. SMART.

TIE PLUG MACHINE.

APPLICATION FILED NOV. 25, 1910.

Reissued June 17, 1913.

13,579.

4 SHEETS—SHEET 1.

WITNESSES:
Geo. E. Eckland
Edward A. Paul

INVENTOR
HARRY G. SMART
Paul & Paul ATTORNEYS
BY A. W. Paul

H. G. SMART.

TIE PLUG MACHINE.

APPLICATION FILED NOV. 25, 1910.

Reissued June 17, 1913.

13,579.

4 SHEETS—SHEET 2.

WITNESSES.

Geo. E. Eckland

Edward A. Paul

INVENTOR

HARRY G. SMART

Paul & Paul ATTORNEYS

BY A. C. Paul

H. G. SMART.

TIE PLUG MACHINE.

APPLICATION FILED NOV. 25, 1910.

Reissued June 17, 1913.

13,579.

4 SHEETS—SHEET 3.

WITNESSES:

Geo. E. Eckland

Edward A. Paul

INVENTOR

HARRY G. SMART

Paul & Paul ATTORNEYS

BY A. C. Paul

H. G. SMART.

TIE PLUG MACHINE.

APPLICATION FILED NOV. 25, 1910.

Reissued June 17, 1913.

13,579.

4 SHEETS—SHEET 4.

WITNESSES:
Geo. E. Eckland
Edward A. Paul

INVENTOR
HARRY G. SMART
Paul & Paul ATTORNEYS
BY A. P. Paul,

UNITED STATES PATENT OFFICE

HARRY G. SMART, OF ST. CLOUD, MINNESOTA.

TIE-PLUG MACHINE.

13,579. Specification of Reissued Letters Patent. Reissued June 17, 1913.

Original No. 956,207, dated April 26, 1910, Serial No. 393,871. Application for reissue filed November 25, 1910. Serial No. 594,229.

*To all whom it may concern:*

Be it known that I, HARRY G. SMART, a citizen of the United States, residing at St. Cloud, in the county of Stearns and State of Minnesota, have invented certain new and useful Improvements in Tie-Plug Machines, of which the following is a specification.

My invention relates to machines for cutting and pointing plugs used for filling the holes in wooden railway ties when the spikes are removed to prevent them from decaying and has for its object the provision of a machine that is automatic in its operation, the stock of proper width being fed into the machine and cut off and pointed and delivered a finished plug.

The details of construction of my invention will be described hereinafter and illustrated in the accompanying drawings in which—

Figure 1:
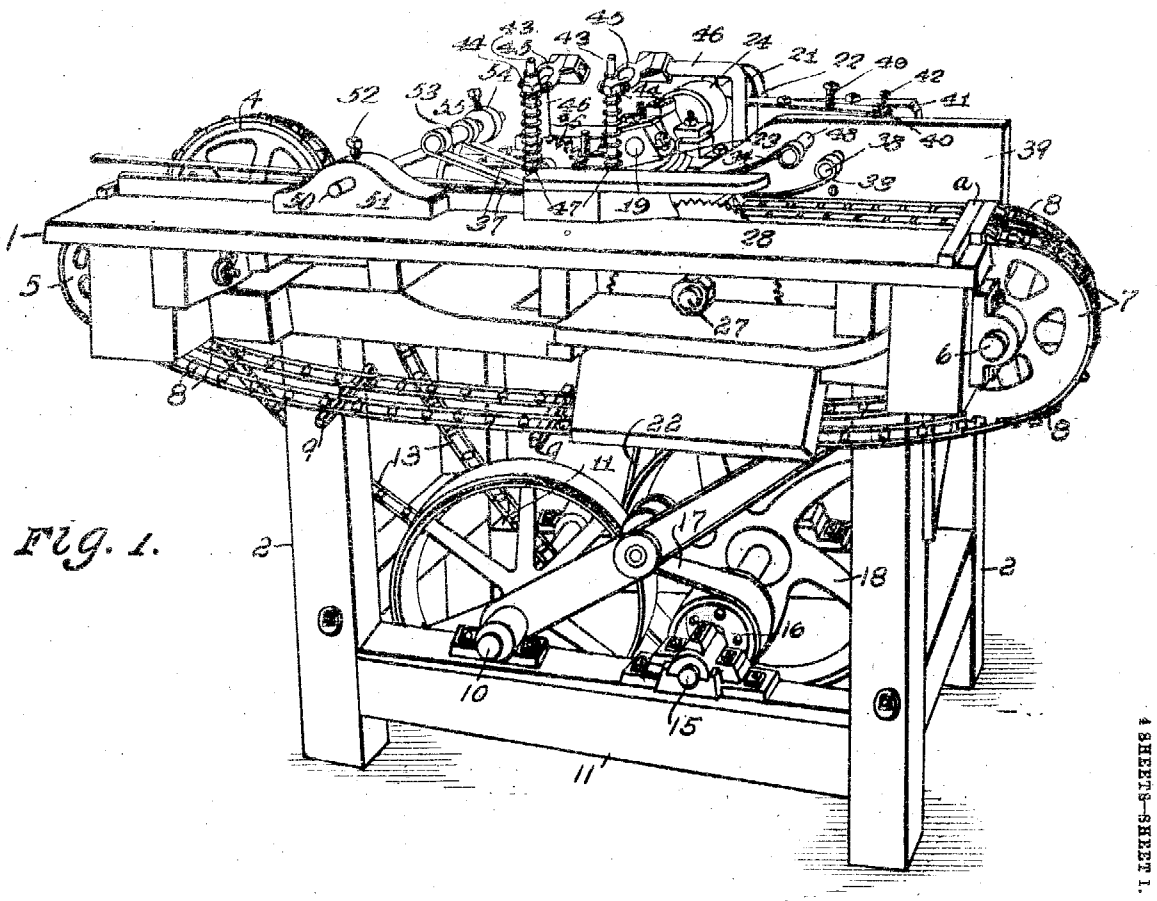
Figure 2:
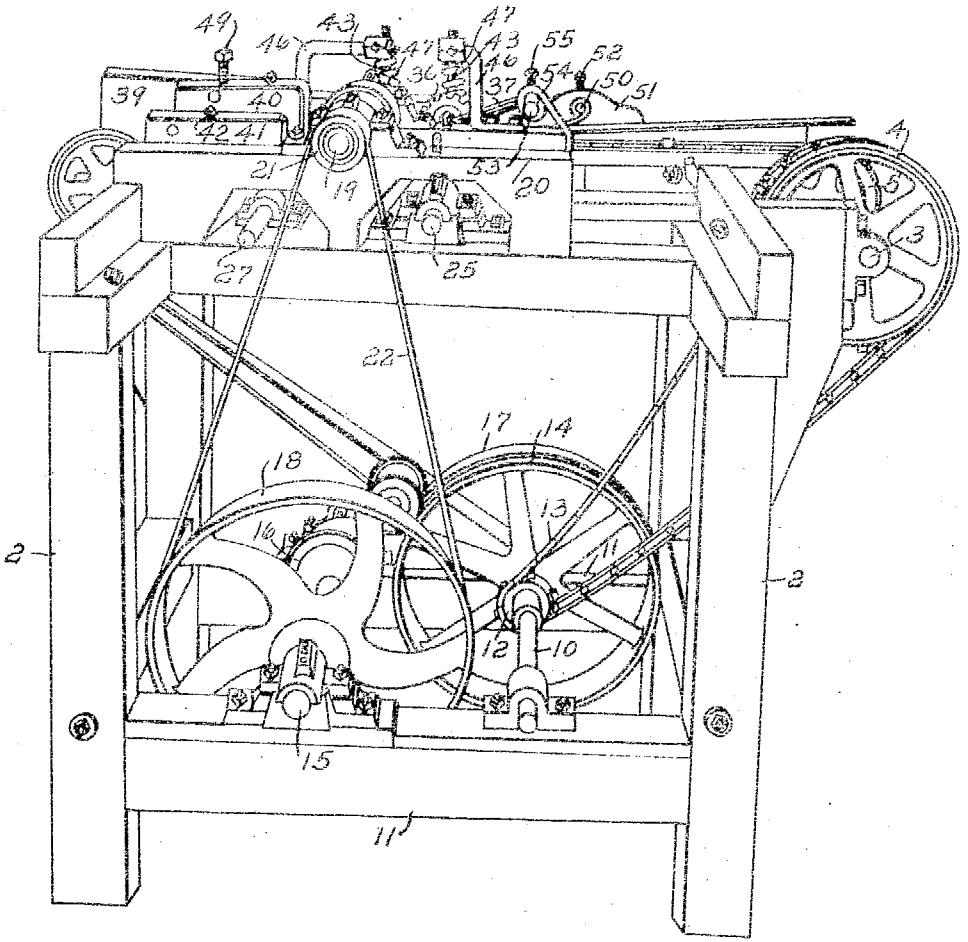
Figure 3:
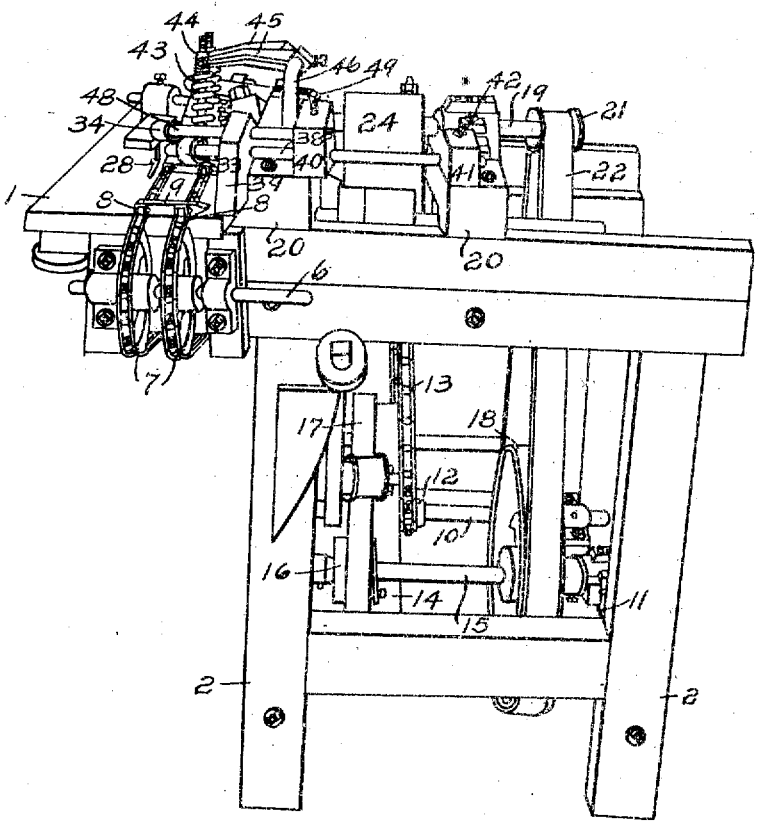
Figure 4:
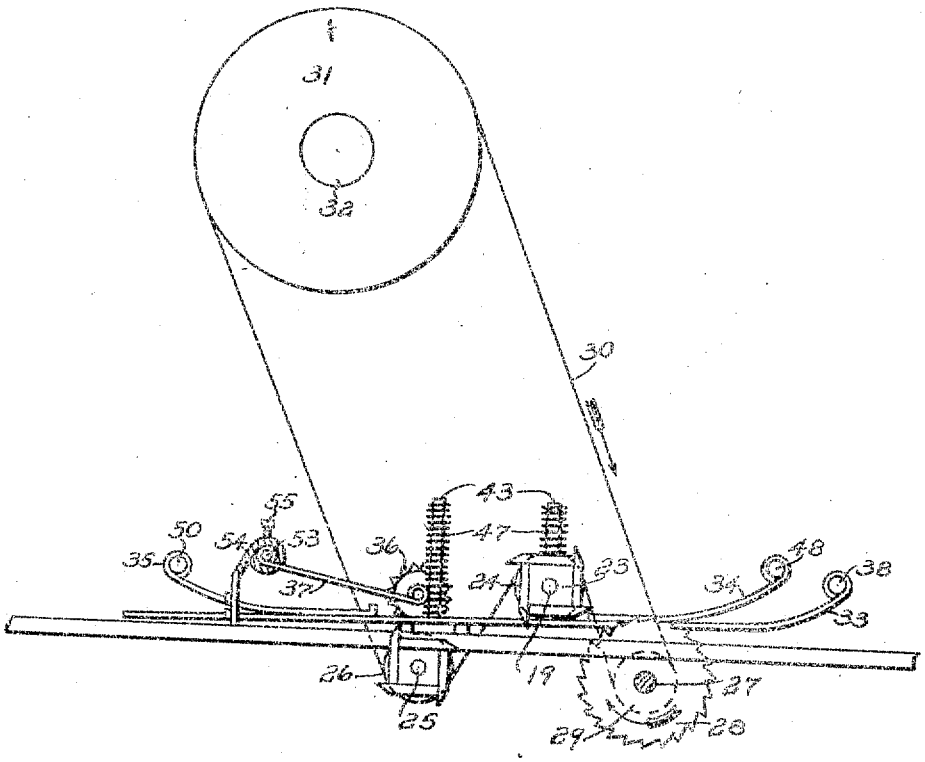
Figure 5:
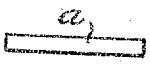
Figure 6:
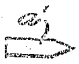

Figure 1 is a side view in perspective of my improved machine, Fig. 2 a similar view of the opposite side, Fig. 3 an end view in perspective, Fig. 4 a longitudinal sectional view, Fig. 5 a view showing a blank from which the plugs are made, and Fig. 6 a view showing a completed plug.

In the drawings similar reference characters indicate corresponding parts throughout the several views.

The table 1 of my improved machine is supported by legs 2.

3 indicates a shaft journaled at one end of table 1 having a driving sprocket wheel 4 keyed thereto and two smaller wheels 5 secured thereon. 6 indicates another shaft journaled at the other end of table 1 having two sprocket wheels 7 secured thereto.

8 indicates twin chains geared to sprocket wheels 5 and 7 and having cleats 9 secured thereto at intervals to feed the plugs into the machine for cutting and shaping them by the instrumentalities hereinafter described.

10 indicates a shaft journaled on cross pieces 11 and having a sprocket wheel 12 keyed thereon on which is geared a sprocket chain 13 that is also geared on sprocket wheel 4.

14 indicates a belt pulley keyed to shaft 10. 15 indicates another shaft journaled on cross pieces 11 and having a belt pulley 16 keyed thereto and geared to pulley 14 by means of belt 17, while 18 indicates another pulley keyed to shaft 15.

19 indicates a shaft journaled on suitable supports 20 on table 1 having a pulley 21 keyed at one end thereof and geared to the pulley 18 by means of belt 22 and by means of which the chains 8 are driven. 23 indicates a cutter head secured to the other end of shaft 19 and 24 a pulley keyed to the shaft intermediate of its ends. Cutter head 23 is arranged above the table so as to cut the upper side of the plug blank.

25 indicates a shaft journaled on the table 1 and having a cutter head thereon to trim the under side of the plug blank, and a pulley 26 keyed thereto. 27 indicates a third shaft journaled on table 1 and having a saw 28 secured thereto and a driving pulley 29 keyed thereon.

30 indicates the driving belt, shown only in Fig. 4, that is geared on pulleys 24, 26 and 29 and on a pulley 31 keyed to the driving shaft 32.

In order to hold the plug blanks while being shaped by the instrumentalities above described, I provide a pressure bar 33, spring bars 34 and 35 and a spur wheel 36 rotatably mounted between the free ends of spring arms 37. The pressure bar 33 has one end secured to a pin 38 secured to vertical guide plate 39 and to blocks 40 and 41; which plugs are carried by the table. The pin 38 is held in place by a set screw 42.

43 indicates upright rods secured to bar 33 and slidably mounted in sleeves 44 pivotally secured to arms 45 mounted on supports 46 secured to table 1.

47 indicates an expansible coil spring mounted on each rod 43 and having its ends engaging the pressure bar 33 and sleeve 44 in which the upper end of the rod is mounted. The rods 43 are located adjacent to the shafts 19 and 25 so as to add to the effectiveness of the hold of the pressure bar 33 on the plug blanks while being operated on by the cutter heads on said shafts. The spring bar 34 has one end secured to a pin 48 secured to guide plate 39 and block 40 by means of set screw 49 while its free end is opposite shaft 19 to assist in holding the plug blank in place while being shaped by cutter head 23. Spring bar 35 is secured to pin 50 mounted in block 51 secured to table 1, said pin being held in position in said block by means of set screw 52. Spring arms 37 are secured to pin 53 mounted in support 54 on table 1 by means of set screw 55. The free end of spring bar 35 and the spur wheel 36 engage the plug blank above the cutter head on shaft 25 and hold it in position while its under side is being sharpened.

The purpose of set screws 42, 49, 52 and 55 is to permit the regulation of the tension of pressure bar 33, spring bars 34 and 35, and spring arms 37 by permitting positioning the pins to which they are attached as desired for the most effectual operation.

From the above description, it will be apparent that the pressure bar 33 is pivoted to the guide plate at a point in advance of the cutters and the saw. This pivotal connection will allow the pressure bar to move vertically, while it will prevent any longitudinal movement of said bar. Therefore, by this construction, I have provided means whereby the bar is so supported that the rods connected thereto and yieldingly pressing the same against the plug blanks may move freely in their bearings, without any binding or lateral strain thereon, due to the movement of the plug blanks through the machine, and the frictional drag of the pressure bar on said blanks.

In operation the plug blanks are fed into the machine at the right hand end of Fig. 1, the operator laying them on the twin chains 8 so that they may be engaged by cleats 9 which serve to carry the blanks through the machine. In placing the blanks in position one end is made to touch the guide plate 39. Just before reaching the saw 28 the top of the blank is engaged by pressure bar 33 and when the blank reaches the saw it is cut off the proper length. The blank is then carried on by the chains 8 under pressure bar 33 to the cutter head 23 where the upper side of its inner end is beveled or sharpened. After this the blank is carried to the cutter on shaft 25 where it is beveled on its under side. The completed plug then carried on by the chains 8 and dumped off of the left end of the machine as shown in Fig. 1.

In Fig. 5 *a* indicates the blank from which the plug *a'* in Fig. 6 is sloped.

I claim as my invention:

1. In a tie plug machine, the combination with a suitable table, of an endless conveyer traversing said table, cutter head located above said conveyer, a pressure bar mounted upon a pivotal support above said table and extending across the same substantially parallel to the line of movement of said conveyer, said pivotal support being in front of the cutter head, and spring-actuated means engaging the pressure bar adjacent to said cutter head, substantially as described.

2. In a tie plug machine, the combination with a suitable table, of an endless conveyer traversing said table, cutter heads located above and below said conveyer, a pressure bar mounted upon a pivotal support above said table and extending across the same substantially parallel to the line of movement of said conveyer, said pivotal support being located in front of the cutter heads, and spring-actuated means engaging said pressure bar adjacent to the lower cutter head, to hold said pressure bar firmly against a tie plug blank, being moved forward by said conveyer while it is being operated upon by said lower cutter head, substantially as described.

3. In a tie plug machine, the combination with a suitable table, of an endless conveyer traversing said table, a guide plate extending parallel to said conveyer for a portion of its length, a saw arranged to cut blanks being moved forward by said conveyer with the ends of the blanks in engagement with said guide plate, a pressure bar extending above and substantially parallel with said conveyer, means for pivotally supporting said pressure bar at a point in front of the saw, cutter heads arranged above and below the conveyer, and positioned to operate upon the blanks being carried forward by the conveyer, and yielding means engaging said pressure bar adjacent to said cutter heads for forcing said pressure bar toward the table while being operated upon by the cutter heads, substantially as described.

4. In a tie-plug machine, a table, an endless conveyer traversing said table, a saw located adjacent to the feeding end of the table, cutter-heads located above and below said conveyer, a pressure bar pivotally secured to a pin mounted on the table in front of said saw, said pressure bar being located above the conveyer aforesaid, upright rods arranged above said pressure bar adjacent to the cutter-heads aforesaid, and slidably mounted in supports carried by the table, and coil springs engaging said supports and forcing said pressure bar toward said table, substantially as described.

5. In a tie-plug machine, a table, an endless conveyer traversing said table, a saw located adjacent to the feeding end of the table, cutter-heads located above and below said conveyer, a pressure bar pivotally secured to a pin mounted on the table in front of said saw, said pressure bar being located above the conveyer aforesaid, upright rods secured to said pressure bar adjacent to the cutter-heads aforesaid, and slidably mounted in supports carried by the table, and coil springs engaging said supports and forcing said pressure bar toward said table, substantially as described.

6. In a tie-plug machine, a table, an endless conveyer traversing said table, a saw located adjacent to the feeding end of the table, cutter-heads located above and below said conveyer, a pressure bar secured to a pin mounted on the table, the said pressure bar being located above the conveyer aforesaid, upright rods secured to said pressure bar adjacent to the cutter-heads aforesaid, and slidably mounted in sleeves supported by the table, and expansible coil springs engaging said sleeves and pressure bar, spring bars adjustably mounted on the table and ending adjacent to the cutter-heads aforesaid, spring arms adjustably mounted on the table, and a spur wheel journaled on said arms above the cutter head beneath the table, substantially as shown and described.

7. A tie-plug machine comprising a table, an endless conveyer traversing said table, a saw located adjacent to the feeding end of the table, cutter-heads located above and below said conveyer, a pressure bar secured at one end to the table and located above said conveyer, upright supports secured to the table and having laterally extending arms, sleeves pivotally secured to the free ends of said arms, rods secured to the pressure bar and slidably mounted in said sleeves, coil springs mounted on said rods and engaging the pressure bar and sleeves to normally depress the pressure bar, spring bars adjustably secured to the table and ending adjacent to the cutter-head above the table, spring arms adjustably mounted on the table, and a spur wheel journaled on said arms above the cutter-head located under the table, substantially as shown and described.

In testimony whereof, I have hereunto set my hand this 18th day of October, 1910.

HARRY G. SMART.

Witnesses:
G. E. SORENSEN,
C. H. REHFUSS.